(12) United States Patent
Sittler et al.

(10) Patent No.: US 6,612,174 B2
(45) Date of Patent: Sep. 2, 2003

(54) OPTICAL PRESSURE SENSOR

(75) Inventors: Fred C. Sittler, Excelsior, MN (US); Charles R. Willcox, Eden Prairie, MN (US); Stanley E. Rud, Jr., Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 64 days.

(21) Appl. No.: 09/780,148

(22) Filed: Feb. 9, 2001

(65) Prior Publication Data

US 2002/0020221 A1 Feb. 21, 2002

Related U.S. Application Data

(60) Provisional application No. 60/181,866, filed on Feb. 11, 2000.

(51) Int. Cl.[7] ................................................. G01L 9/00
(52) U.S. Cl. ............................................. 73/705; 250/234
(58) Field of Search ........................... 73/700, 705, 718, 73/724; 250/231.11, 578.1, 234

(56) References Cited

U.S. PATENT DOCUMENTS

| | | | | |
|---|---|---|---|---|
| 3,479,879 A | 11/1969 | Music | ........................ | 73/398 |
| 3,965,746 A | 6/1976 | Rabek | ........................ | 73/398 |
| 4,260,883 A | 4/1981 | Onoda et al. | ............... | 250/226 |
| 4,269,069 A | 5/1981 | Handtmann et al. | .......... | 73/705 |
| 4,301,492 A | 11/1981 | Paquin et al. | ............... | 361/283 |
| 4,336,567 A | 6/1982 | Anastasia | .................... | 361/283 |
| 4,366,716 A | 1/1983 | Yoshida | ........................ | 73/718 |
| 4,388,833 A | 6/1983 | Kuwayama | ................... | 73/718 |
| 4,458,537 A | 7/1984 | Bell et al. | ....................... | 73/718 |
| 4,475,405 A | 10/1984 | Corpron et al. | ........... | 73/861.24 |
| 4,507,973 A | 4/1985 | Barr et al. | ...................... | 73/724 |
| 4,523,474 A | 6/1985 | Browne et al. | ................ | 73/724 |
| 4,562,742 A | 1/1986 | Bell | ............................. | 73/718 |
| 4,574,327 A | 3/1986 | Wilner | ........................ | 361/283 |
| 4,594,504 A | 6/1986 | Coursolle et al. | ............ | 250/227 |
| 4,612,810 A | 9/1986 | Martens | ........................ | 73/705 |
| 4,620,093 A | * 10/1986 | Barkhoudarian et al. | ... | 250/231 |
| 4,626,680 A | * 12/1986 | Martens et al. | ......... | 250/231.19 |
| 4,680,971 A | 7/1987 | Kavli et al. | .................... | 73/718 |

(List continued on next page.)

FOREIGN PATENT DOCUMENTS

| | | |
|---|---|---|
| DE | 43 33 753 A1 | 5/1994 |
| DE | 196 17 696 A1 | 11/1997 |
| DE | 198 24 778 A1 | 10/1999 |
| JP | 56162027 | 12/1981 |
| JP | 6-300650 | 10/1994 |
| WO | WO 99/66299 | 12/1999 |

*Primary Examiner*—Edward Lefkowitz
*Assistant Examiner*—Jermaine Jenkins
(74) *Attorney, Agent, or Firm*—Westman, Champlin & Kelly, P.A.

(57) ABSTRACT

A pressure sensor configured to sense an applied pressure, comprising a diaphragm support structure, a diaphragm coupled to the diaphragm support structure and configured to deflect in response to applied pressure, a moveable member coupled to the diaphragm and configured to move in response to deflection of the diaphragm, and an optical interference element coupled to the moveable member and configured to interfere with incident light, wherein the interference is a function of position of the moveable member.

25 Claims, 5 Drawing Sheets

U.S. PATENT DOCUMENTS

| | | | |
|---|---|---|---|
| 4,729,240 A | 3/1988 | Sugihara et al. ............... 73/705 |
| 4,735,098 A | 4/1988 | Kavli et al. .................... 73/718 |
| 4,873,870 A | 10/1989 | Delatorre ..................... 73/733 |
| 4,884,450 A | 12/1989 | Greenwood et al. .......... 73/702 |
| 4,899,046 A | 2/1990 | Wright et al. ............... 250/227 |
| 4,933,545 A | 6/1990 | Saaski et al. .......... 250/227.14 |
| 5,009,107 A | 4/1991 | Grasdepot ................... 73/705 |
| 5,022,270 A | 6/1991 | Rud, Jr. ....................... 73/706 |
| 5,105,665 A | 4/1992 | Parsons et al. ............... 73/704 |
| 5,134,887 A | 8/1992 | Bell ............................ 73/718 |
| 5,152,173 A | 10/1992 | Willson ....................... 73/702 |
| 5,155,653 A | 10/1992 | Kremidas ................... 361/283 |
| 5,166,679 A | 11/1992 | Vranish et al. ........ 340/870.37 |
| 5,186,054 A | 2/1993 | Sekimura ..................... 73/724 |
| 5,195,374 A | 3/1993 | Parsons et al. ............... 73/704 |
| 5,247,171 A | 9/1993 | Wlodarczyk et al. .. 250/227.21 |
| 5,252,826 A | 10/1993 | Kemp ................... 250/231.19 |
| 5,293,046 A | 3/1994 | Wheatley ................ 250/458.1 |
| 5,317,918 A | 6/1994 | Lew ............................ 73/718 |
| 5,323,656 A | 6/1994 | Fung et al. .................... 73/718 |
| 5,333,504 A | 8/1994 | Lutz et al. .................... 73/727 |
| 5,385,053 A | 1/1995 | Wlodarczyk et al. .......... 73/704 |
| 5,422,478 A | 6/1995 | Wlodarczyk et al. ....... 250/227 |
| 5,431,057 A | 7/1995 | Zimmer et al. ............... 73/724 |
| 5,442,347 A | 8/1995 | Vranish ................. 340/870.37 |
| 5,479,827 A | 1/1996 | Kimura et al. ................ 73/718 |
| 5,485,345 A | 1/1996 | Lukasiewicz et al. .... 261/283.3 |
| 5,486,976 A | 1/1996 | Charboneau et al. .... 361/283.4 |
| 5,675,086 A | 10/1997 | Kihara et al. ................. 73/718 |
| 5,760,310 A | 6/1998 | Rud, Jr. et al. ............... 73/706 |
| 5,763,769 A | 6/1998 | Kluzner ....................... 73/115 |
| 5,917,180 A | 6/1999 | Reimer et al. ......... 250/227.14 |
| 5,936,235 A | 8/1999 | Minamitani et al. ... 250/227.16 |
| 5,999,319 A | 12/1999 | Castracane .................. 359/573 |
| 6,122,971 A | 9/2000 | Wlodarczyk ................. 73/705 |
| 6,422,084 B1 * | 7/2002 | Fernald et al. ................ 73/705 |

\* cited by examiner

OPTICAL PRESSURE SENSOR

The present application is based on and claims the benefit of U.S. provisional patent application Serial No. 60/181,866, filed Feb. 11, 2000, the content of which is hereby incorporated by reference in its entirety.

BACKGROUND OF THE INVENTION

The present invention relates to pressure sensors. More specifically, the invention relates to pressure sensors which measure deflection using optical techniques.

Pressure sensors are used to measure pressures of various media and have a wide range of uses in industrial, commercial and consumer applications. For example, in industrial process control, a pressure sensor can be used to measure the pressure of a process fluid. The pressure measurement can then be used as an input to a formula which provides an indication of another process variable such as a fluid level or a flow rate.

There are a number of different techniques which are used to measure pressures. One basic technique involves the use of a deflectable diaphragm. In such a pressure sensor, a pressure is applied to the diaphragm, either directly or through an isolating medium, and the deflection of the diaphragm is measured. Various deflection measurement techniques can be used. For example, a strain gauge mounted to the diaphragm can provide an indication of deflection. In another technique, the deflection causes a change in capacitance which can be measured and correlated to the applied pressure. Preferably, pressure sensors are able to have long lives, provide high accuracy and are capable of withstanding environmental extremes, exposure to caustic fluids, vibrations, impacts and other potentially damaging inputs.

Typically, the techniques which are used to measure deflection require electrical contact to electrical components which are carried on the pressure sensor. Such contact can be difficult to achieve and can be a source of failure. Additionally, the additional processing as well as the electrical components themselves can be a source of errors in pressure measurements.

SUMMARY OF THE INVENTION

In one aspect, the present invention provides a pressure sensor which does not require electrical contact to the diaphragm of the sensor or the surrounding material.

The pressure sensor is configured to sense an applied pressure. A diaphragm support structure is coupled to a diaphragm which deflects in response to applied pressure. A moveable member is coupled to the diaphragm and moves in response to deflection of the diaphragm. An optical interference element moves with the moveable member and is configured to interfere with incident light. The interference is a function of position of the moveable member. In one aspect, the moveable member is coupled between opposed diaphragms. In this configuration, a pressure sensor is less susceptible to being damaged when exposed to high pressures.

DETAILED DESCRIPTION OF THE PREFERRED EMBODIMENTS

Figure 1:
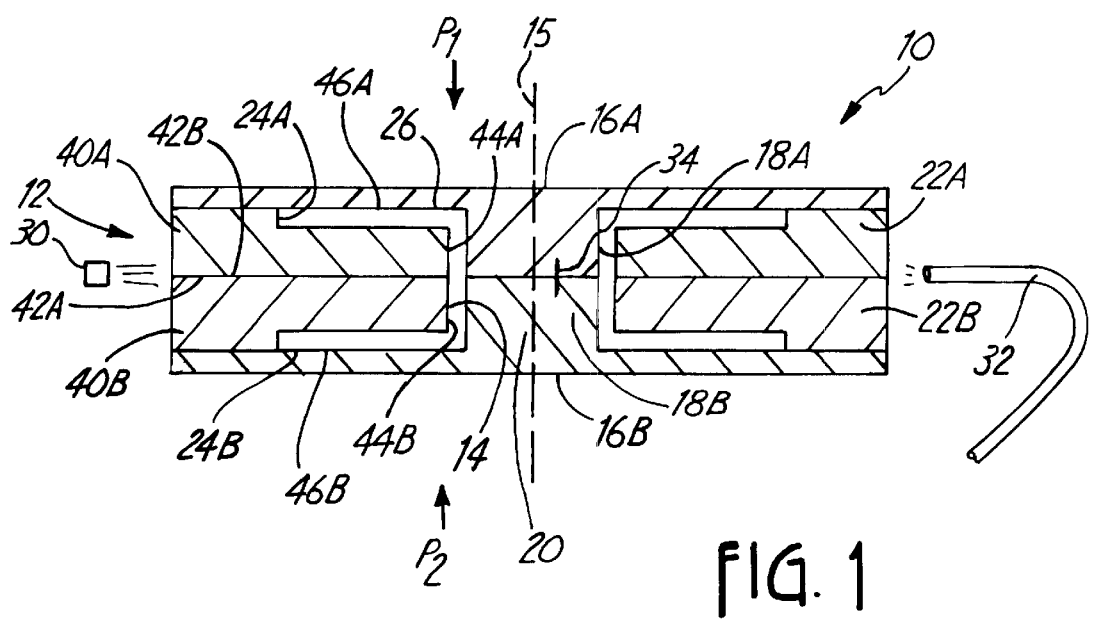
FIG. 1 is a side cross-sectional view of a pressure sensor in accordance with one embodiment of the present invention.

A pressure sensor using optical sensing is shown at 10 in FIG. 1. Generally, the pressure sensor 10 includes a diaphragm support structure 12 having a bore 14. Isolator diaphragms 16A and 16B are mounted to opposite sides of the diaphragm support structure 12, while in the embodiment illustrated, portions 18A and 18B are secured together to form a rigid coupling member 20 extending within the bore 14. In addition, the isolator diaphragms 16A and 16B are secured to the diaphragm support structure 12 on outer peripheries or rims 22A and 22B to form corresponding annular cavities 24A and 24B that open to and are about an axis 15 of the bore 14. The annular cavities 24A and 24B provide space between opposed surfaces of each of the isolator diaphragms 16A and 16B, and the diaphragm support structure 12. This, in turn, also allows the isolator diaphragms 16A and 16B to deflect relative to the diaphragm support structure 12 in response to a difference in pressure $P_1$ and $P_2$, while providing inherent overtravel protection. The rigid coupling member 20 formed by portions 18A and 18B couples the isolator diaphragms 16A and 16B together and replaces an incompressible fluid commonly used in differential pressure sensors.

The diaphragm support structure 12 and the isolator diaphragms 16A and 16B define a cavity 26 comprising bore 14 and annular cavities 24A and 24B that can be completely isolated and sealed from the external environment. The inside of the cavity 26 can be evacuated or filled with an inert gas. However, the cavity 26 need not be evacuated and can be left at gauge pressure. Since the cavity 26 is substantially isolated, changes in environmental conditions will have less of an effect on sensing elements mounted within the cavity 26 to measure displacement of the isolator diaphragms 16A and 16B relative to the diaphragm support structure 12. In addition, dust particles cannot easily enter the cavity 26.

With the present invention, deflection of diaphragms 16A, 16B is detected using an optical technique. In the example illustrated in FIG. 1, an optical receiver 30 receives light from an optical source 32. Source 32 and receiver 30 are positioned on opposite sides of sensor 10. Movement of diaphragms 16A and 16B can cause distortion in the transmitted light. An optical member 34, such as a defraction grading, can be coupled to diaphragms 16A and 16B at coupling member 20 to enhance the distortion and deflection of the light traveling between the source 32 and the receiver 30. In one embodiment, light is reflected from sensor 10 and the source 32 and receiver 30 are positioned accordingly.

Preferably, at least the isolator diaphragms 16A and 16B are made of chemically resistant material that does not degrade in order that the isolator diaphragms 16A and 16B can directly receive the process fluids to be measured. For example, the isolator diaphragms 16A and 16B can be made from a single crystal corundum such as "sapphire" or "ruby" containing chromium. The material that is substantially transparent so that the sensor 10 can carry light from source 32. The diaphragm support structure 12 can also be made from the same material as the isolator diaphragms 16A and 16B, and can be directly fusion bonded to the isolator diaphragms 16A and 16B on the rims 22A and 22B at a temperature lower than the melting point of the material used to form these components. When crystalline materials, such as sapphire are used, the resulting structure of the pressure sensor 10 behaves elastically without hysteresis. Furthermore, since the diaphragm support structure 12 and the isolator diaphragms 16A and 16B are formed of the same material, stress induced by different rates of thermal expansion is minimized. Other suitable materials include spinels, zirconia and silicon. When a material such as silicon is used, an oxide or other insulator may be required.

In one embodiment, direct bonding of the rims 22A and 22B to the corresponding isolator diaphragms 16A and 16B is used which typically requires that each of the bonding surfaces be atomically smooth. One alternative method of attachment includes depositing a glass or suitable metallic solder (preferably having a thermal expansion coefficient similar to the diaphragm support structure 12 and the isolator diaphragms 16A and 16B) on the rims 22A and 22B and/or the opposing surfaces of the isolator diaphragms 16A and 16B. By applying heat and pressure, such as in an evacuated press, a seal is formed between the rims 22A and 22B and the corresponding isolator diaphragms 16A and 16B. Since the seal forms an interface layer between the rims 22A and 22B and the isolator diaphragms 16A and 16B, atomically smooth surfaces are not required.

In the embodiment illustrated, the diaphragm support structure 12 includes substantially identical base members 40A and 40B secured together on planar surfaces 42A and 42B, respectively. Each base member 40A and 40B includes an aperture 44A and 44B respectively, aligned with each other to form the bore 14. Annular cavities 24A and 24B are formed by providing recessed surfaces 46A and 46B on the base members 40A and 40B below the outer peripheries 22A and 22B and about the apertures 44A and 44B.

Figure 2:
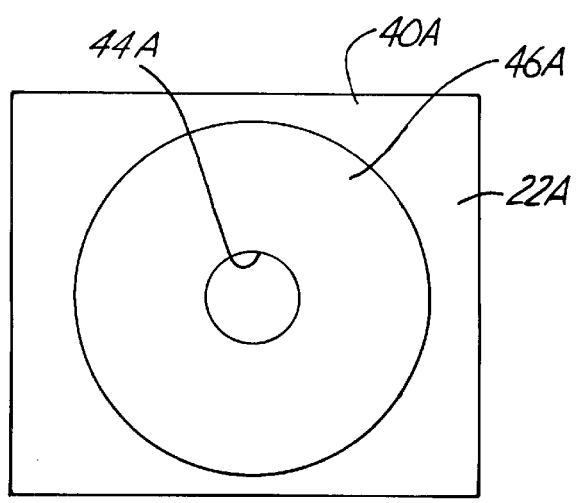
FIG. 2 is a top plan view of one layer in the pressure sensor of FIG. 1.
Figure 3:
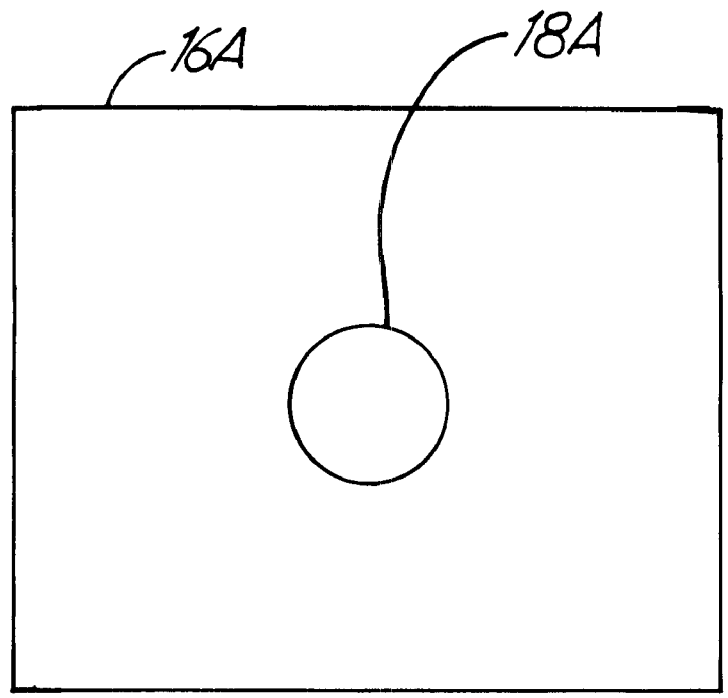
FIG. 3 is a top plan view of another layer in the pressure sensor of FIG. 1.

FIGS. 2 and 3 show top plan views of base member 40A and isolator diaphragm 16A, respectively. Base members 40A and 40B are identical as are isolator diaphragm 16A and isolator diaphragm 16B. In this manner, only two unique components (i.e., the isolator diaphragms 16A and 16B and the base members 40A and 40B) need be manufactured and assembled to form the pressure sensor 10. Members 40A and 40B can also be integral components forming a single member in which case no surface bonds 42A and 42B are required. As appreciated by those skilled in the art, if desired, the base members 40A and 40B can be simple blocks of material, while the isolator diaphragms 16A and 16B have corresponding rims to form the annular cavities 24A and 24B.

If the pressure sensor 10 is formed from sapphire or other similar crystalline materials, a suitable method of fabrication includes first micro-machining the isolator diaphragms 16A and 16B, and the base members 40A and 40B (or the diaphragm support structure 12 if the base members 40A and 40B are integrally joined together). Suitable micromachining techniques include wet or dry chemical etching, and ion or ultrasonic milling techniques. Grating 34 can be fabricated directly onto the member 20, adhered or applied using any appropriate technique.

The pressure sensor 10 can then be assembled by first securing the isolator diaphragm 16A to the base member 40A, and then securing the isolator diaphragm 16B to the base member 40B. The base member 40A and 40B can then be secured along surfaces 42A and 42B, which would also form the coupling member 20 by securing the portion 18A to the portion 18B. Using separate base members 40A and 40B, which are later bonded together, is particularly advantageous because each of the components, the isolator diaphragms 16A and 16B and the base members 40A and 40B, need only be machined on one side thereof.

It should be understood that although isolator diaphragms 16A and 16B are preferably substantially identical for the reasons discussed above, if desired, the isolator diaphragms 16A and 16B can be machined differently. For example, the portions 18A and 18B can be of different length such that one of the portions 18A and 18B extends further within bore 14 or out of the bore 14.

Source 32 is illustrated as an optical fiber, however, any type of optical source can be used including a light emitting diode, a laser diode, etc. Source 32 can also be placed close to member 20. For example, an optical channel can extend between surfaces 42A and 42B to a location proximate member 20. Similarly, receiver 30 can be placed near sensor 10 or light can be conducted for example through an optical fiber, to the receiver 30. Further, appropriate optics such as polarizers or optics to provide coherent light can be placed between the source and pressure sensor 10. The light entering pressure sensor 10 can be coherent or incoherent.

Movement of coupling member 20 is detected based upon variations in the light received by receiver 30. The sensed variations in the light received can be used to determine the differential pressure applied to pressure sensor 10. In general, the light will enter the side of the pressure sensor 10, i.e., the light will have a vector component which is perpendicular to the deflection of member 20. Further, the material used to fabricate sensor 10 should be at least partially transparent to the light provided by source 32. Member 20 constitutes a moveable member, however, other configurations and orientations can be used with the invention. In one general aspect, the member 20 can be any structure which moves in response to applied pressure. In general, the member 20 simply needs to be either formed directly from the diaphragm or otherwise be coupled to the diaphragm in a manner such that the member 20 moves in response to diaphragm deflection. The member 20 can be formed integrally with the diaphragm or can be formed from a separate component coupled to the diaphragm by any appropriate technique.

A diffraction grating or other optical interference element 34 is carried on member 20. Movement of the optical interference element 34 causes the detectable light variations that can be used to determine pressure. In one embodiment, member 20 or element 34 can reflect the light. In such an embodiment, sensor 30 need not be positioned opposite source 32. For example, the light can be reflected back toward source 32 which, if source 32 is an optical fiber, can conduct light to a light sensor 30 located remotely. The movement of member can be detected based upon any phenomena which causes light variations. These can be, for example, interference patterns, intensity variations, phase shifts, polarization variations, etc. Further, interference element 34 can comprise a change in the material, such as a void, within member 20 which alters the speed of the light through the member 20.

Multiple optical sensors can be used which sense more than one pressure. In one technique, the light is directed from a side of sensor 10 toward a diaphragm such as diaphragm surface that carries a reflective element. For example, diaphragm 16A and 16B in FIG. 1 can be a reflective surface. In such an embodiment, movement of the surface will cause displacement of the optical beam. The diaphragm itself comprises moveable member 20 and the interference element is either the diaphragm itself or an element carried on the diaphragm. The deflective element can form an interference pattern in the reflected light which will change in accordance with deflection.

Figure 4:
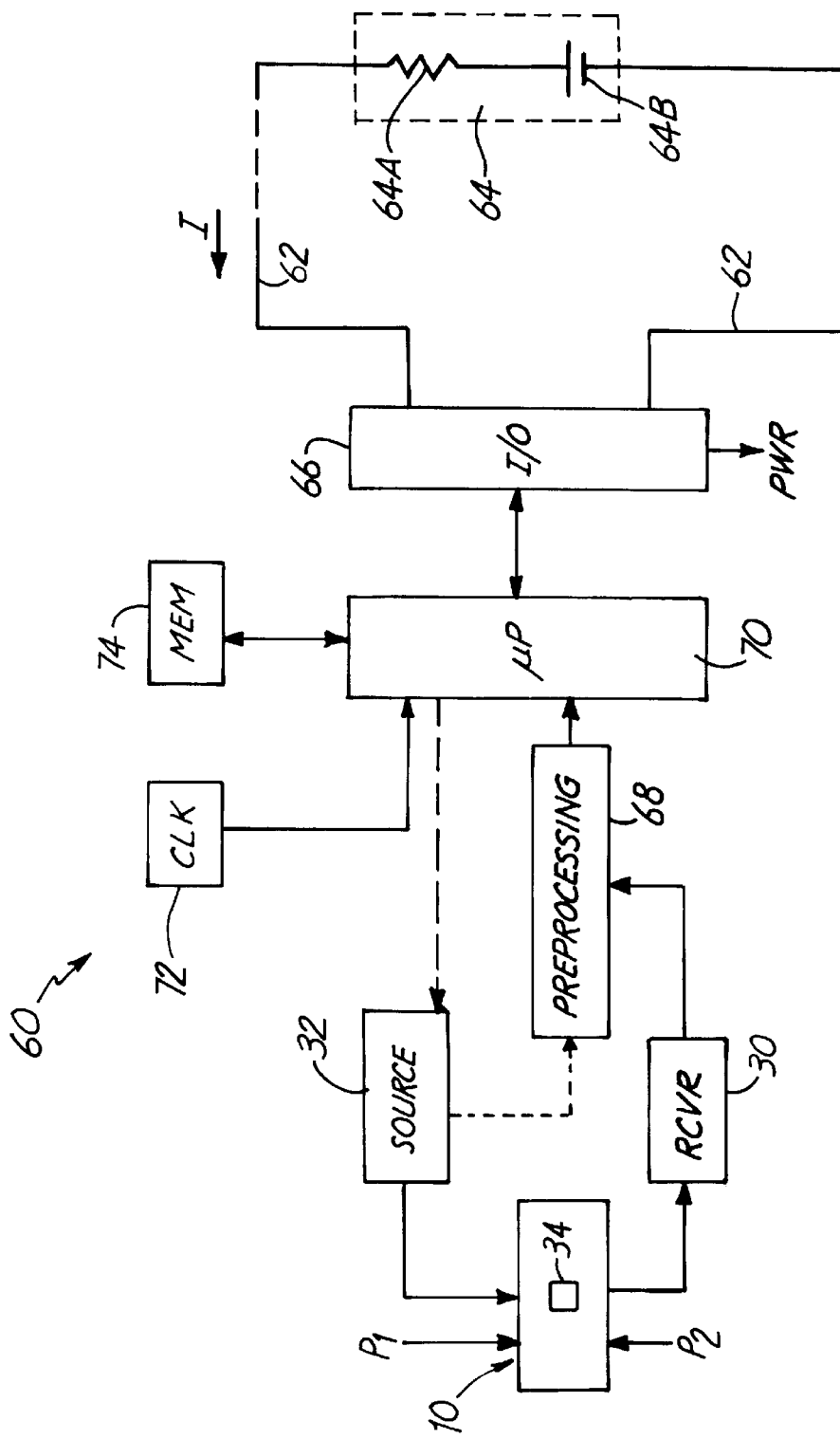
FIG. 4 is a simplified electrical schematic diagram of a pressure transmitter which uses the pressure sensor of FIG. 1.

FIG. 4 is a simplified schematic diagram of a process transmitter 60 employing pressure sensor 10. Sensor 10 is shown in simplified form and receives two pressures, $P_1$ and $P_2$. As discussed above, optical interference element 34 moves in response to a difference between pressures $P_1$ and $P_2$ Transmitter 60 is shown coupled to a two-wire process control loop 62. Loop 62 shown for example purposes only and the sensor 10 or transmitter 60 can be used in other environments. Loop 62 can comprise, for example, a process control loop which carries both power and information related to pressures $P_1$ and $P_2$ measured by sensor 10. Example loops includes loops in accordance with industry standards such as the HART® standard and FOUNDATION™ Fieldbus standard. Loop 62 couples to a remote location such as a control room 64. Control room 64 is shown in electrical schematic form as a resistance 64A and a voltage source 64B. In one embodiment, loop 62 carries a current I which is controlled by I/O circuitry 66 in transmitter 60 to be related to pressures $P_1$ and $P_2$. In some configurations, transmitter 60 is powered using power generated by I/O circuitry 66 from power which is completely received from loop 62. This power is used to completely power transmitter 60. A preprocessing circuit 68 receives an output from receiver 64 and responsively provides an input to microprocessor 70 which is related to deflection of a diaphragm in sensor 10 and the resultant movement of optical interference element 34. Microprocessor 70 operates at a rate determined by a clock 72 and in accordance with instructions stored in a memory 74. Preprocessing circuitry 68 can be any type of circuitry which is capable of detecting variations in the output from the receiver 30 due to the variations in the light received by receiver 30 in response to movement of optical interference element 34. Some sensing techniques may use the output from source 32 as a reference. Additionally, source 32 can be controlled or modulated by microprocessor 70. Microprocessor 70 can also perform the computations required to convert the received signal into a signal representative of diaphragm deflection, applied pressure, or more advanced process variables such as process fluid flow rate or process fluid level. The diagram shown for transmitter 60 in FIG. 4 is provided for explanatory purposes only and other embodiments can be implemented by those skilled in the art. In actuality, the various components may not be discrete components and may be implemented in hardware, software, or their combination.

Figure 5:
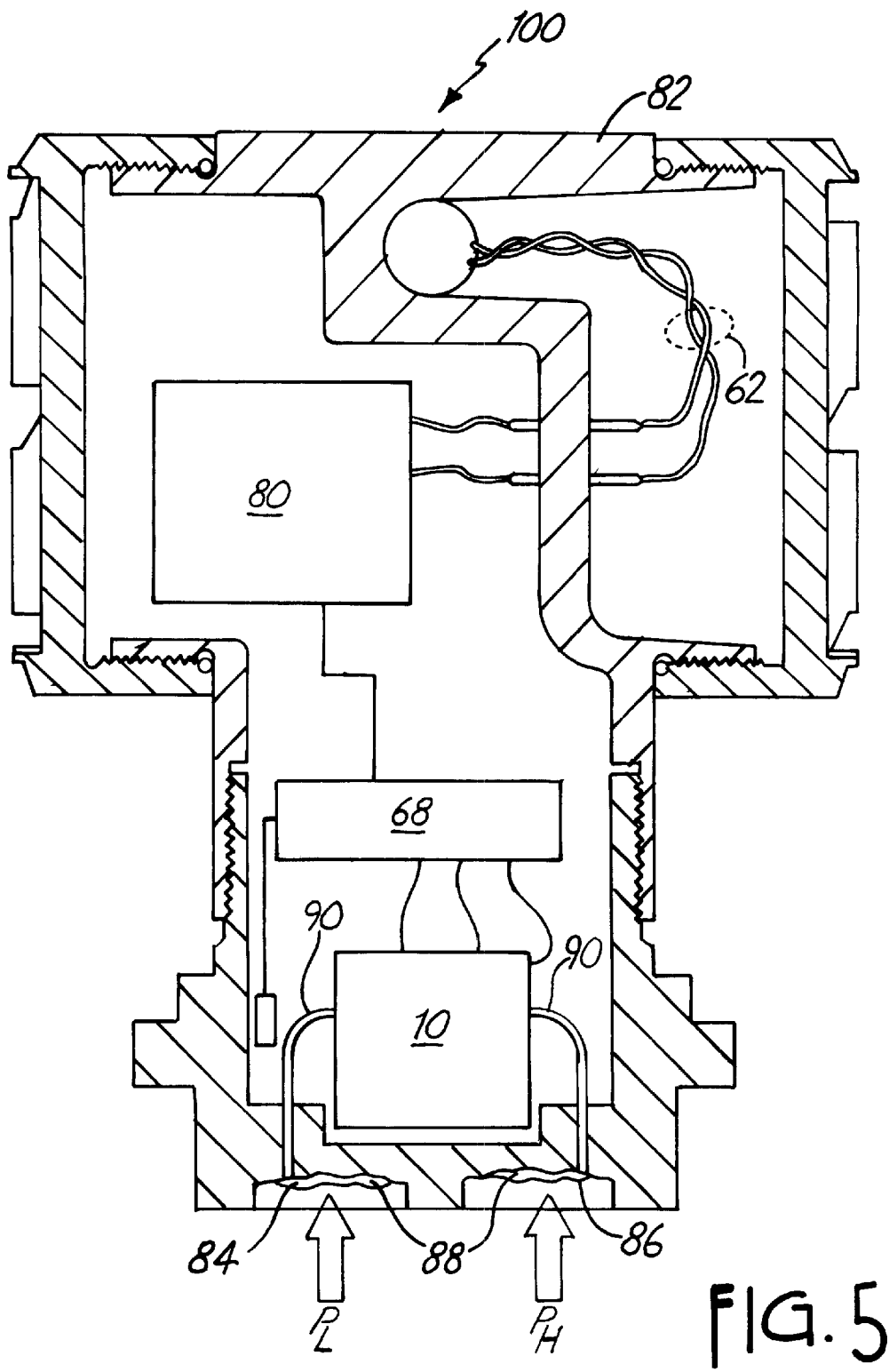
FIG. 5 is a cross-sectional view of a pressure transmitter including the pressure sensor of FIG. 1.

FIG. 5 is a cross-sectional view of a transmitter 100 which includes a pressure sensor 10 in accordance with the present invention. Transmitter 10 is shown in simplified form to explain one possible configuration for coupling a pressure sensor 10 to process fluid. The pressure sensor of the present invention can be used in direct contact with process fluid or when isolated from process fluid using appropriate techniques. The invention can be used with any appropriate type of pressure sensor structure. Example structures are shown in U.S. patent application Ser. No. 09/780,033, entitled "OIL-LESS DIFFERENTIAL PRESSURE SENSOR", filed Feb. 9, 2001, which is incorporated herein by reference. Transmitter 100 includes sensor 10 in accordance with an embodiment of the present invention. Additionally, transmitter 100 includes housing 82 which is a ruggedized enclosure suitable for protecting the contents of housing 82 from harsh environmental extremes. Process pressures $P_L$ and $P_H$ are coupled to diaphragms 84, 86, respectively and such pressures are conveyed to sensor 10 through tubes 90 via fill fluid 88. As illustrated, preprocessing circuitry 68 is coupled to sensor 10 and provides a signal to circuitry 80 that is indicative of differential pressure. Circuitry 80 can include any suitable circuitry such as microprocessor 70 (shown in FIG. 4) and I/O circuitry 66 (also shown in FIG. 4). Connectors 62 extend to an axis point through which transmitter 100 is coupled to a process control loop 62 as described above. Process control loop 62 can provide operating energy to transmitter 100. Additionally, process control loop 62 can operate in accordance with suitable process control protocols such as the HART® protocol and the FOUNDATION™ Fieldbus protocols, for example.

Although the present invention has been described with reference to preferred embodiments, workers skilled in the art will recognize that changes may be made in form and detail without departing from the spirit and scope of the invention. Although the terms "optical" and "light" have been used herein, these terms are intended to include appropriate wavelength including non-visible wavelengths. Further, the sensor can be used to measure differential, gauge or absolute pressure.

What is claimed is:

1. A pressure sensor configured to sense an applied pressure, comprising:

a diaphragm support structure;

a diaphragm coupled to the diaphragm support structure and configured to deflect in response to applied pressure;

a moveable member coupled to the diaphragm and configured to move in response to deflection of the diaphragm;

a second diaphragm coupled to the moveable member; and an optical interference element coupled to the moveable member and configured to interfere with incident light, wherein the interference is a function of position of the moveable member and the optical interference element comprises a grating, the grating arranged perpendicular to the diaphragm and parallel with movement of the movable member.

2. The pressure sensor of claim 1 wherein the optical interference element is configured to interfere with light having a vector component perpendicular with a direction of movement of the moveable member.

3. The pressure sensor of claim 1 wherein the optical interference element comprises a reflective element.

4. The pressure sensor of claim 1 including a light source configured to direct light toward the optical interference element and a receiver configured to receive light from the light source which has been interfered with by the optical interference element.

5. The pressure sensor of claim 4 wherein the source is directed at the receiver.

6. The pressure sensor of claim 4 wherein the receiver receives light reflected by the optical interference element.

7. The pressure sensor of claim 4 wherein at least one of the source and receiver includes an optical fiber.

8. The pressure sensor of claim 1 wherein the applied pressure comprises a differential pressure.

9. The pressure sensor of claim 1 wherein the applied pressure comprises an absolute pressure.

10. The pressure sensor of claim 1 wherein the applied pressure comprises a gauge pressure.

11. The pressure sensor of claim 1 wherein the diaphragm support structure includes an outer periphery having an open center formed therein configured to receive the moveable member.

12. The pressure sensor of claim 11 wherein the outer periphery includes an annular recess formed therein configured to receive deflection of the diaphragm.

13. The pressure sensor of claim 1 wherein the diaphragm support includes first and second outer peripheries.

14. The pressure sensor of claim 1 wherein the diaphragm support is at least partially transparent to transmit the incident light therethrough to the optical interference element.

15. The pressure sensor of claim 1 wherein the diaphragm support comprises sapphire.

16. The pressure sensor of claim 1 including at least one direct fusion bond.

17. The pressure sensor of claim 1 wherein the light comprises visible light.

18. The pressure sensor of claim 1 wherein the diaphragm and moveable member are integral.

19. The pressure sensor of claim 1 wherein the diaphragm is in direct contact with a process fluid which provides the applied pressure.

20. The pressure sensor of claim 1 wherein the diaphragm is isolated from the process fluid by an isolation fluid.

21. The pressure sensor of claim 1 wherein the moveable member is coup led between the diaphragms.

22. The pressure sensor of claim 21 wherein each diaphragm includes opposed moveable members coupled therebtween.

23. The pressure sensor of claim 22 wherein the moveable members are integral with the diaphragms.

24. A process transmitter comprising:
    a pressure sensor including:
        a diaphragm support structure;
        a diaphragm coupled to the diaphragm support structure and configured to deflect in response to applied pressure;
        a moveable member coupled to the diaphragm and configured to move in response to deflection of the diaphragm;
        an optical interference element coupled to the moveable member and configured to interfere with incident light, wherein the interference is a function of position of the moveable member wherein the optical interference element comprises a grating, the grating arranged perpendicular to the diaphragm and parallel with movement of the movable member;
    an output configured to provide a transmitter output related to sensed pressure; and
    I/O circuitry configured to couple to a two-wire process loop.

25. The process transmitter of claim 24 wherein circuitry in the transmitter is completely powered with power from the process control loop.

* * * * *

UNITED STATES PATENT AND TRADEMARK OFFICE
CERTIFICATE OF CORRECTION

PATENT NO.   : 6,612,174 B2
DATED        : September 2, 2003
INVENTOR(S)  : Fred C. Sittler et al.

It is certified that error appears in the above-identified patent and that said Letters Patent is hereby corrected as shown below:

<u>Column 7,</u>
Line 28, delete "coup led" and insert -- coupled --.

Signed and Sealed this

Twentieth Day of April, 2004

JON W. DUDAS
*Acting Director of the United States Patent and Trademark Office*